US012461867B1

(12) United States Patent
Becht et al.

(10) Patent No.: US 12,461,867 B1
(45) Date of Patent: Nov. 4, 2025

(54) INPUT/OUTPUT PROCESSOR POWER MANAGEMENT

(71) Applicant: INTERNATIONAL BUSINESS MACHINES CORPORATION, Armonk, NY (US)

(72) Inventors: Michael James Becht, Poughkeepsie, NY (US); Pasquale A. Catalano, Wallkill, NY (US); Christopher J Colonna, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 18/751,677

(22) Filed: Jun. 24, 2024

(51) Int. Cl.
*G06F 13/12* (2006.01)
*G06F 11/20* (2006.01)

(52) U.S. Cl.
CPC ........ *G06F 13/122* (2013.01); *G06F 11/2097* (2013.01)

(58) Field of Classification Search
CPC ............................ G06F 13/122; G06F 11/2097
See application file for complete search history.

(56) References Cited

U.S. PATENT DOCUMENTS

| | | | |
|---|---|---|---|
| 11,764,987 B2 | 9/2023 | Shribman | |
| 2012/0131379 A1* | 5/2012 | Tameshige | G06F 9/5077 714/E11.073 |
| 2015/0186636 A1 | 7/2015 | Tharappel | |

FOREIGN PATENT DOCUMENTS

CN    118037284 A  *  5/2024  .........  H04L 67/1008

OTHER PUBLICATIONS

Translation of CN-118037284-A (Year: 2024).*
US 9,646,144, 06/2017, Tharappel Francis M (withdrawn).
Disclosed Anonymously, "Method and Apparatus for Improved Adapter Error Recovery in Multitenant Storage Systems," IP.com, Apr. 13, 2021, 10 pages, IP.com No. IPCOM000265462D, Retrieved from the Internet: <URL: https://priorart.ip.com/IPCOM/000265462>.
Disclosed Anonymously, "Method for an Effective Management of Status/Display Indicators Thereby Conserving Energy in Data Centers, Network and IT Infrastructures," IP.com, Mar. 27, 2012, 6 pages, IP.com No. IPCOM000216276D, Retrieved from the Internet: <URL: https://priorart.ip.com/IPCOM/000216276>.
Disclosed Anonymously, "PowerSave schema for storage devices," IP.com, Nov. 28, 2018, 5 pages, IP.com No. IPCOM000256390D, Retrieved from the Internet: <URL: https://priorart.ip.com/IPCOM/000256390>.

(Continued)

*Primary Examiner* — Henry Tsai
*Assistant Examiner* — John B Roche
(74) *Attorney, Agent, or Firm* — Teddi E. Maranzano (57) ABSTRACT

A method, computer system, and a computer program product for sustainable data storage is provided. An IOP discovers a path between each defined I/O adapter and its endpoint. Based on a system configuration and the discovered pathing, the IOP builds a table comprising each I/O adapter, endpoint, initial adapter state. The IOP creates an I/O adapter redundancy mapping from the table and assign performance thresholds to each I/O adapter. The IOP continuously monitors utilization of each I/O adapter, whereby based on utilization for the I/O adapter reaching a defined threshold, the IOP enables a redundant I/O adapter path, whereby the redundant I/O adapter is a proxy for the I/O adapter.

20 Claims, 3 Drawing Sheets

(56) References Cited

OTHER PUBLICATIONS

Mohanram, et al., "Input Ordering in Concurrent Checkers to Reduce," Proceedings of the 17th IEEE International Symposium on Defect and Fault Tolerance in VLSI Systems (DFT'02) [article], Oct. 2002, 9 pages, Retrieved from the Internet: <URL: https://www.researchgate.net/publication/2861964_Input_Ordering_in_Concurrent_Checkers_to_Reduce>.

Texas Instruments, "Extracting Maximum Power from an Adapter with Input Current Optimization Feature," Application Report [SLVA812C], Aug. 2016 [revised Aug. 2019], 9 pages, Retrieved from the Internet: <URL: https://www.ti.com/lit/an/slva812c/slva812c.pdf?ts=1708476576745&ref_url=https%253A%252F%252Fwww.ti.com%252Fproduct%252FBQ25895>.

TI Designs, "Optimizing Efficiency by Handshaking Adjustable Adapters and Battery Chargers Reference Design," System Overview [TIDUCP6], Nov. 2016, 11 pages, Retrieved from the Internet: <URL: https://www.ti.com/lit/ug/tiducp6/tiducp6.pdf?ts=1708547056138&ref_url=https%253A%252F%252Fwww.google.com%252F>.

Zhang, "Lecture 21 Power Optimization (Part 2)," Washington University in St. Louis [course administrivia], Fall 2016, 26 pages, Retrieved from the Internet: <URL: https://classes.engineering.wustl.edu/ese461/>.

\* cited by examiner

INPUT/OUTPUT PROCESSOR POWER MANAGEMENT

BACKGROUND

The present invention relates generally to the field of computing, and more particularly to data storage technology.

In computing systems, it can happen that adapters are either under-utilized or not utilized at all. Yet, these adapters are powered up in the input/output (I/O) cage anyway, and are consuming power.

It would be advantageous from a sustainability perspective to identify adapters that are under-utilized and place the adapter in a lower power consumption state, without interrupting the operating system processing.

SUMMARY

Embodiments of the present invention disclose a method, computer system, and a computer program product are provided. An IOP discovers a path between each defined I/O adapter and its endpoint. Based on a system configuration and the discovered pathing, the IOP builds a table comprising each I/O adapter, endpoint, initial adapter state. The IOP creates an I/O adapter redundancy mapping from the table and assign performance thresholds to each I/O adapter. The IOP continuously monitors utilization of each I/O adapter, whereby based on utilization for the I/O adapter reaching a defined threshold, the IOP enables a redundant I/O adapter path, whereby the redundant I/O adapter is a proxy for the I/O adapter.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

A method, computer program product and system are provided for IOP power management. As such, the present embodiment has the capacity to improve the technical field of computer sustainability by identifying adapters that are under-utilized and place the adapter in a lower power consumption state, without interrupting the operating system processing.

Embodiments of the present invention are described with reference to the z/Architecture® hardware architecture offered by International Business Machines Corporation. The z/Architecture hardware architecture, however, is only one example architecture. Aspects of the invention may also be based on other architectures, including, but not limited to, the Intel x86 architectures, other architectures of International Business Machines Corporation, and/or architectures of other companies.

In the architecture, each processor controls I/O operations to a number of adapter cards that are installed in an I/O drawer. Each I/O drawer is attached (cabled) to the processors and can be installed along with other I/O drawers in a cabinet. The processors are likewise grouped together with memory modules and other similar specialized hardware in a central electronic complex (CEC). The I/O adapter cards can be configured in one or more groups, according to the needs of the business enterprise. The architecture recognizes each of these groups as an I/O domain.

Upon initial machine load (IML) each IOP receives a configuration of the I/O adapter cards in its I/O domain. Using the configuration input, the IOP identifies each I/O adapter with an endpoint to form a channel. The configuration also defines redundant paths, or channels. The IOP verifies that the path between each adapter and each endpoint exists and is operational. The IOP then creates a table from this identified configuration input, along with physical I/O adapter characteristics such as power consumption and speed, and whether all or only a combination of the I/O adapters are initially available. The table also includes business enterprise preferences such as initial adapter states (enabled, disabled), redundancies, preferred path and performance usage thresholds for each I/O adapter.

In operation, the IOP receives read/write I/O requests from the operating system, and drives them to the requested endpoints. The requested channel may not be available, for example, because the configuration input specified that it should be initially disabled. In that case, the IOP selects a channel defined as a redundant proxy channel that has the same attachment profile (e.g., preferred speed, latency, features) and updates its tables that this is the proxy that responds to the I/O request. However, the operating system is agnostic to the processing. Therefore, the operating system continues to issue I/O requests to the original channel, but the IOP transform the request to use the proxy. The IOP continuously monitors channel utilization to identify whether a utilization threshold for a particular I/O adapter or proxy is reached. In that case, another redundant I/O adapter is enabled and the IOP uses the total bandwidth to service I/O requests. If utilization falls below a configurable threshold, the redundant I/O adapter is either powered off or placed in a reduced power utilization state, depending on the architecture. The channel utilization data is readily available through native operating system facilities or through third party performance monitoring utilities, among other sources.

It is notable that the I/O adapter card configuration that is exposed to the operating system is not necessarily the same as that governing each of the IOPs. Particularly, in the IOP configuration, select I/O adapters, such as those known for high power consumption but not necessarily high utilization, can initially be configured in a disabled state, or selected as the preferred I/O adapter to power off. In this way based on utilization and power consumption, the IOP drives I/O operations to the least power consuming I/O adapter that still delivers the required performance metric and connectivity. In hardware laboratory testing, the power savings are estimated to be up to 30 watts per I/O adapter card. The operating system is agnostic to the IOP's actions, as the IOP communicates directly with firmware on the I/O adapters. Therefore, while the operating system may be generating I/O operations based on the configuration in its memory, the IOP configuration operations are based on the status of I/O adapters in its configuration. Generally, reconfiguring I/O adapters is a manual system administrator process that requires at least one interrupt to be sent to the operating system to cause a pause while the operating system performs internal housekeeping tasks, such as rebuilding its device tables and restarting any interrupted I/O operations on behalf of applications. Therefore, in addition to power consumption savings from efficient I/O adapter management, additional power consumption savings can be derived from those operating system, application, and associated machine instructions that are avoided.

According to an aspect of the invention, there is provided a computer-implemented method. An IOP discovers a path between each defined I/O adapter and its endpoint. Based on a system configuration and the discovered pathing, the IOP builds a table comprising each I/O adapter, endpoint, initial adapter state. The IOP creates an I/O adapter redundancy mapping from the table and assign performance thresholds to each I/O adapter. The IOP continuously monitors utilization of each I/O adapter, whereby based on utilization for the I/O adapter reaching a defined threshold, the IOP enables a redundant I/O adapter path, whereby the redundant I/O adapter is a proxy for the I/O adapter.

According to another aspect of the invention, there is provided a computer-implemented method in which the redundant path is disabled upon the utilization of the I/O adapter falling below another defined threshold. This aspect may advantageously reduce power consumption by disabling an unused I/O adapter.

According to another aspect of the invention, there is provided a computer-implemented method whereby there are one or more IOPs, based on the computer system architecture. This aspect may advantageously group IOPs and their I/O adapters by usage characteristics.

According to another aspect of the invention, there is provided a computer-implemented method whereby an operating system is agnostic to the proxy I/O adapter, whereby the operating system continues to issue I/O requests to the I/O adapter. This aspect may advantageously increase performance and reduce power consumption by avoiding unnecessary instructions between the applications, IOPs and operating system.

According to another aspect of the invention, there is provided a computer-implemented method to tag new data and identify a cluster to which it belongs within a model based on a distance to each existing cluster. This aspect may advantageously characterize data access usage more accurately.

According to another aspect of the invention, there is provided a computer-implemented method whereby an entire data cluster moves tiers up or down in response to access statistics and configurable thresholds. This aspect may advantageously reduce data access operations by moving entire clusters at once.

According to another aspect of the invention, there is provided a computer-implemented method whereby a data type is tagged using supervised, semi-supervised, or unsupervised learning. This aspect may advantageously increase accuracy and speed of data characterization.

According to another aspect of the invention, there is provided a computer-implemented method to receive, by a channel subsystem, a command to write data, whereby bandwidth of the redundant I/O adapter is combined with that of the I/O adapter for an increased total bandwidth. This aspect may advantageously increase I/O throughput.

According to another aspect of the invention, there is provided a computer-implemented method whereby the IOP communicates directly with the I/O adapter and the redundant I/O adapter. This aspect may advantageously improve performance and reduce power consumption.

According to an aspect of the invention, there is provided a computer system. An IOP discovers a path between each defined I/O adapter and its endpoint. Based on a system configuration and the discovered pathing, the IOP builds a table comprising each I/O adapter, endpoint, initial adapter state. The IOP creates an I/O adapter redundancy mapping from the table and assign performance thresholds to each I/O adapter. The IOP continuously monitors utilization of each I/O adapter, whereby based on utilization for the I/O adapter reaching a defined threshold, the IOP enables a redundant I/O adapter path, whereby the redundant I/O adapter is a proxy for the I/O adapter.

According to an aspect of the invention, there is provided a computer program product. An IOP discovers a path between each defined I/O adapter and its endpoint. Based on a system configuration and the discovered pathing, the IOP builds a table comprising each I/O adapter, endpoint, initial adapter state. The IOP creates an I/O adapter redundancy mapping from the table and assign performance thresholds to each I/O adapter. The IOP continuously monitors utilization of each I/O adapter, whereby based on utilization for the I/O adapter reaching a defined threshold, the IOP enables a redundant I/O adapter path, whereby the redundant I/O adapter is a proxy for the I/O adapter.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
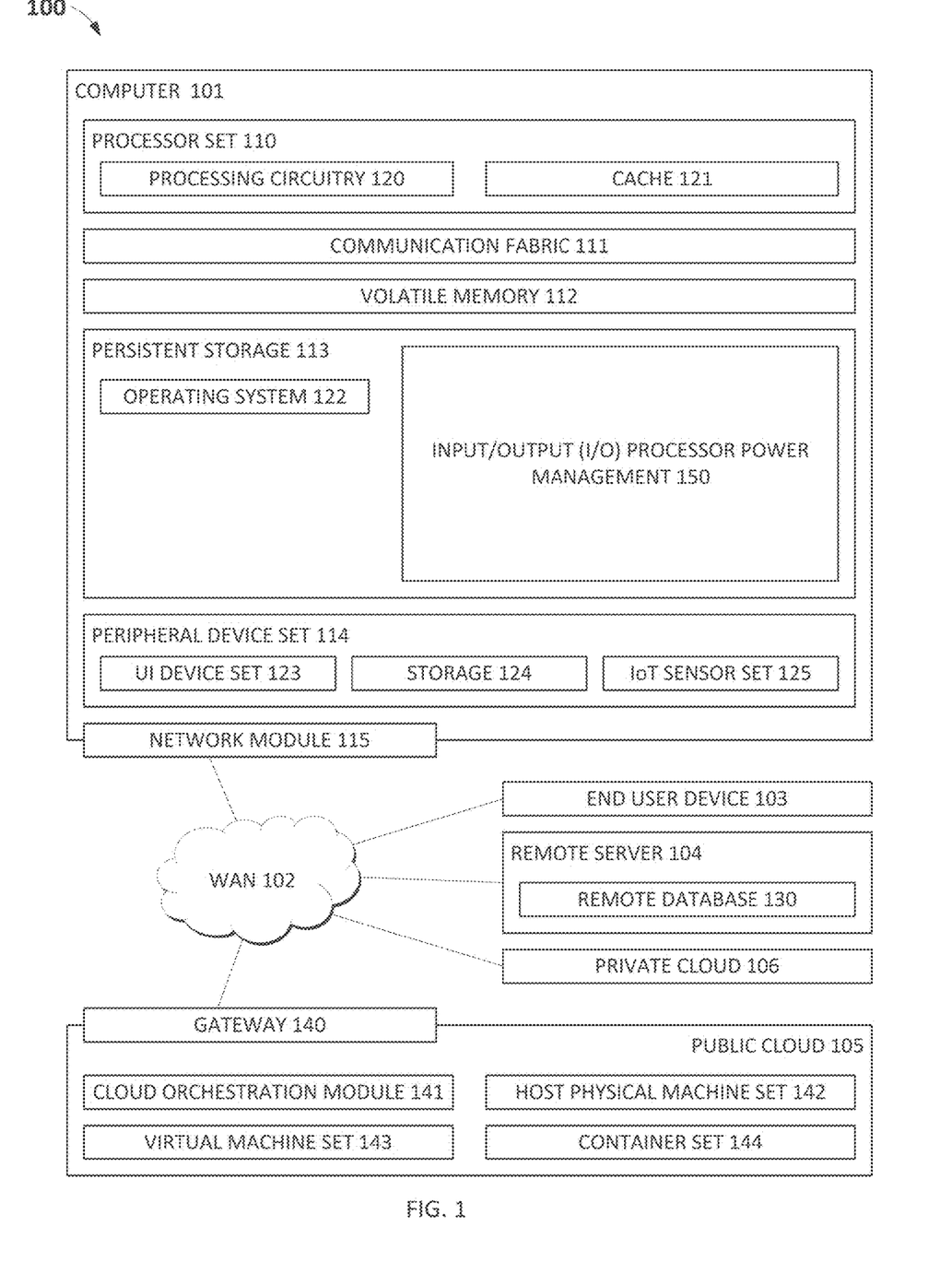
FIG. 1 illustrates a networked computing environment, according to at least one embodiment.

Referring to FIG. 1, a computing environment 100 according to at least one embodiment is depicted. Computing environment 100 contains an example of an environment for the execution of at least some of the computer code involved in performing the inventive methods, such as IOP power management program 150. In addition to the IOP power management program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and IOP power management 150), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Furthermore, despite only being depicted in computer 101, the IOP power management program 150 may be stored in and/or executed by, individually or in any combination, EUD 103, remote server 104, public cloud 105, and private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The IOP power management program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of Bluetooth SIG, Inc. and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, a user using any combination of an EUD 103, remote server 104, public cloud 105, and private cloud 106 may use the IOP power management 150 to generate a custom remark prediction model (e.g., a machine learning model) for each user/meeting participant, to predict and block objectionable remarks from the meeting participant before the objectionable remarks are delivered to the other meeting participants. Embodiments of the present disclosure are explained in more detail below with respect to FIGS. 2-3.

Figure 2:
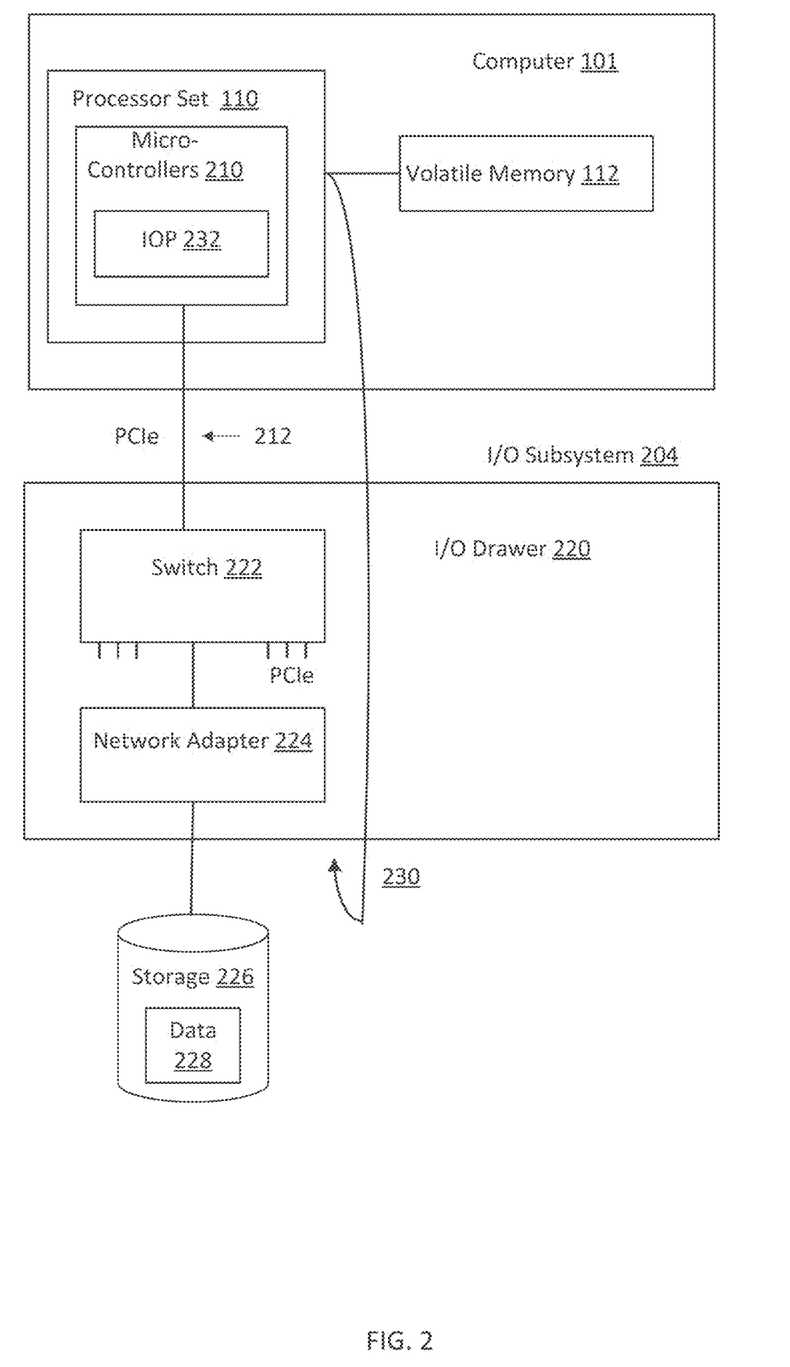
FIG. 2 a block diagram of a computing environment for providing I/O processor (IOP) power management, according to at least one embodiment of the present invention.
Figure 3:
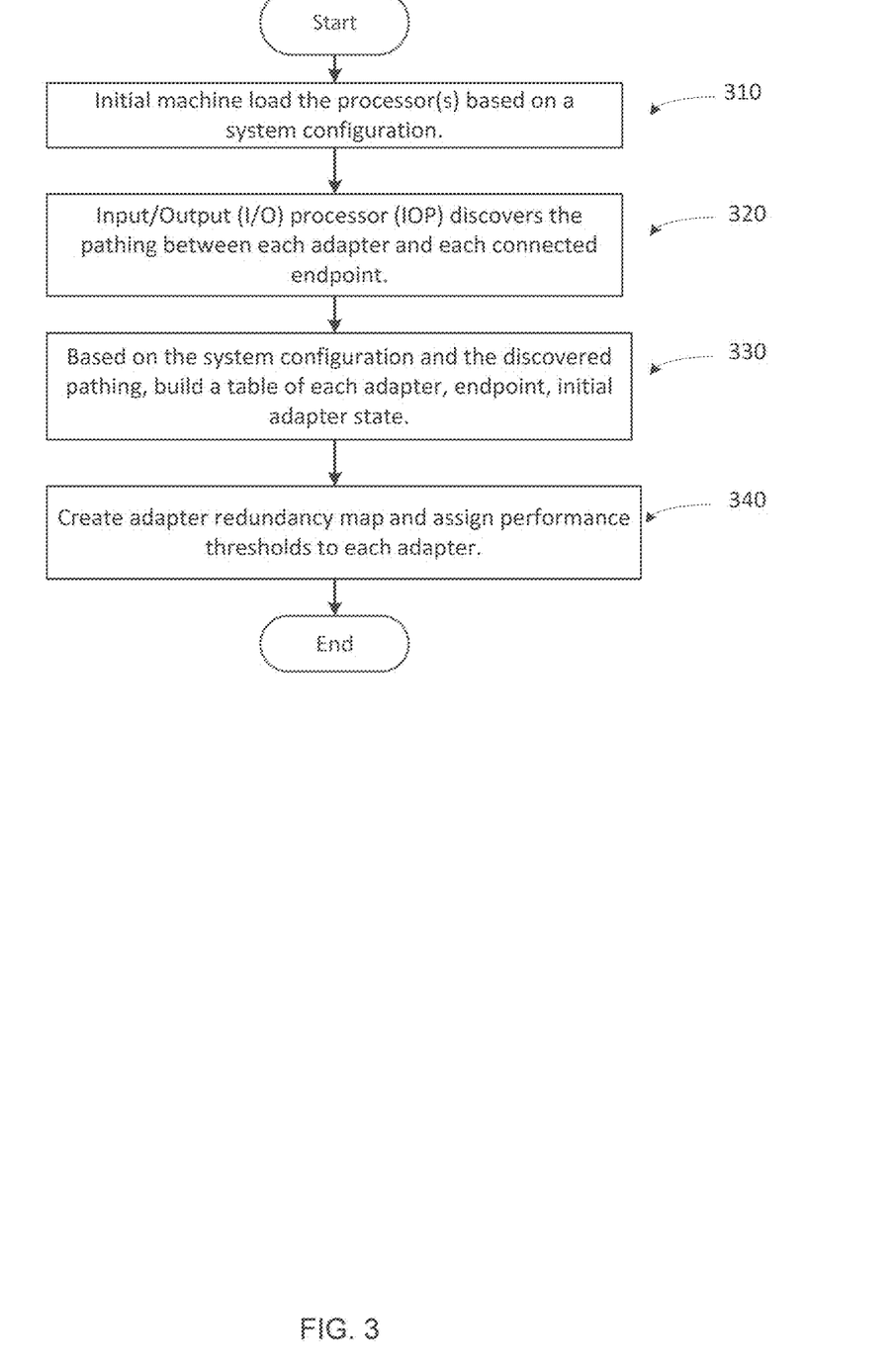
FIG. 3 is an operational flowchart illustrating IOP power management, according to at least one embodiment.

It may be appreciated that FIGS. 2-3 provide only an illustration of one embodiment and do not imply any limitations with regard to how different embodiments may be implemented. Many modifications to the depicted embodiment(s) may be made based on design and implementation requirements.

FIG. 2 shows a block diagram of a computing environment for providing I/O processor (IOP) power management, according to at least one embodiment of the present invention. Although only one is illustrated, the computer 101 may have multiple IOPs.

FIG. 2 includes a computing system 101 coupled to an I/O subsystem 204. As an example, computer 101 includes one or more processors 110 coupled to memory 112 (also referred to as main memory, system memory, storage, main storage, central storage, etc.). In accordance with one or more embodiments of the present invention, the memory 112 includes tables for the IOP power management program 150.

Processors 110 are coupled to I/O subsystem 204 via one or more connections or buses 212, such as one or more Peripheral Component Interconnect express (PCIe) connections. Other connections or buses may also be used. All or a portion of the connections or buses shown in FIG. 1 can be implemented by at least a portion of cloud environment 105, 106 of FIG. 1 and/or WAN (network) 102, 115 of FIG. 1.

I/O subsystem 204 includes one or more input/output drawers 220, and an I/O drawer 220 includes, for instance, one or more switches 222 and one or more network adapters 224. All or a portion of the I/O subsystem 204 can be implemented on one or more computers 101. In one example, a switch 222 is coupled to a processor 110 and a network adapter 224. Network adapter 224 can be one of any type of adapter that the architecture supports.

I/O subsystem 204 is coupled to one or more external storage devices 226 and is used to couple processors 110 to external storage devices 226. Data 228 stored on the external storage devices 226 is transported between the processors 110 and external storage devices 226 via, for instance, I/O operations. As an example, an OS, such as a z/OS® operating system offered by International Business Machines Corporation or a Linux® OS, executing within a processor (e.g., processor 110) uses one or more I/O operations to pull data (e.g., data 228) from an external storage device (e.g., external storage device 226) along a path, such as path 230. Other OSs may also be used.

In one example, one or more processors 110 include one or more micro-controllers 110 used in accordance with one or more aspects of the present invention. For instance, as described herein, one or more of micro-controllers 210 (and/or processing logic of the computing system) are used to determine whether a transformation is to be applied to data of an I/O operation, and to perform a transformation, if a transformation is to be applied. In accordance with one or more embodiments of the present invention, the transformation is performed by the IOP 232 which is a separate microcontroller or is included within a micro-controller (e.g., micro-controller 210).

The one or more micro-controllers (and/or processing logic of the computing system) are used instead of, for instance, a host controller or other controller coupled to the I/O subsystem via one or more connections (e.g., PCIe connections) coupled to a switch (e.g., switch 222). Thus, the decision and performance of a transformation occur in-line with the I/O operation. That is, the decision and performance of the transformation are performed within path 230, independent of a host controller or other such controller coupled to the I/O subsystem outside of path 230.

In a further embodiment, one or more micro-controllers may be located in the I/O subsystem 204 and used, in accordance with an aspect of the present invention, to determine whether a transformation is to be applied and/or to perform such a transformation based on a decision to apply the transformation. Other embodiments are also possible.

The embodiments described herein with respect to the computing environment 100 of FIG. 1 and computer 101 of FIG. 2 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIG. 3 is an operational flowchart illustrating the operation of the IOP power management program 150, according to an embodiment of the present invention.

Upon initial machine load (IML) each IOP receives a configuration of the I/O adapter cards in its I/O domain (310).

Using the configuration input, the IOP identifies each I/O adapter as a channel with an endpoint, along with redundant paths (320).

The IOP creates a table from this identified configuration input, along with physical I/O adapter characteristics such as power consumption and speed, and whether all or only a combination of the I/O adapters are initially available. The table also includes business enterprise preferences such as preferred path and initial I/O adapter states, and user-defined performance thresholds. For example, a definition may specify that when I/O adapter utilization reaches a threshold, such as 50%, then the IOP will power on and enable a defined redundant path. If more than one redundant path is defined, then the definition may specify an order in which the redundant paths are enabled. The bandwidth of both the defined path and the redundant path(s) are combined. Similarly, if the I/O utilization falls below a threshold, such as 30%, then the IOP can disable a redundant path, based on the user defined preference in the configuration (330).

After mapping redundant paths and preferences, the IOP adds any performance thresholds to its table (340).

What is claimed is:

1. A computer-implemented method, comprising:
   discovering by an input/output processor (IOP) a path between each defined I/O adapter and its endpoint;
   based on a system configuration and the discovered pathing, building a table comprising each I/O adapter, endpoint, initial adapter state;
   creating an I/O adapter redundancy mapping from the table and assigning performance thresholds to each I/O adapter; and continuously monitoring, by the IOP, utilization of each I/O adapter, wherein based on the utilization for the I/O adapter reaching a defined threshold, enabling a redundant I/O adapter path, wherein the redundant I/O adapter is a proxy for the I/O adapter.

2. The computer-implemented method of claim 1, wherein the redundant path is disabled upon the utilization of the I/O adapter falling below another defined threshold.

3. The computer-implemented method of claim 1, wherein there are one or more IOPs, based on a computer system architecture.

4. The computer-implemented method of claim 1, wherein each I/O adapter is connected to only one IOP.

5. The computer-implemented method of claim 1, wherein an operating system is agnostic to the proxy I/O adapter, wherein the operating system continues to issue I/O requests to the I/O adapter.

6. The computer-implemented method of claim 1, wherein the bandwidth of the redundant I/O adapter is combined with that of the I/O adapter for an increased total bandwidth.

7. The computer-implemented method of claim 1, wherein the IOP communicates directly with the I/O adapter and the redundant I/O adapter.

8. A computer system, the computer system comprising:
one or more processors, one or more computer-readable memories, one or more computer-readable storage media, a set of computer program instructions stored in the one or more computer-readable memories and executed by at least one of the processors to perform actions of:
discovering by an input/output processor (IOP) a path between each defined I/O adapter and its endpoint;
based on a system configuration and the discovered pathing, building a table comprising each I/O adapter, endpoint, initial adapter state;
creating an I/O adapter redundancy mapping from the table and assigning performance thresholds to each I/O adapter; and
continuously monitoring, by the IOP, utilization of each I/O adapter, wherein based on the utilization for the I/O adapter reaching a defined threshold, enabling a redundant I/O adapter path, wherein the redundant I/O adapter is a proxy for the I/O adapter.

9. The computer system of claim 8, wherein the redundant path is disabled upon the utilization of the I/O adapter falling below another defined threshold.

10. The computer system of claim 8, wherein there are one or more IOPs, based on a computer system architecture.

11. The computer system of claim 8, wherein each I/O adapter is connected to only one IOP.

12. The computer system of claim 8, wherein an operating system is agnostic to the proxy I/O adapter, wherein the operating system continues to issue I/O requests to the I/O adapter.

13. The computer system of claim 8, wherein the bandwidth of the redundant I/O adapter is combined with that of the I/O adapter for an increased total bandwidth.

14. The computer system of claim 8, wherein the IOP communicates directly with the I/O adapter and the redundant I/O adapter.

15. A computer program product, the computer program product comprising a non-transitory tangible storage device having program code embodied therewith, the program code executable by a processor of a computer to perform a method, the method comprising:
discovering by an input/output processor (IOP) a path between each defined I/O adapter and its endpoint;
based on a system configuration and the discovered pathing, building a table comprising each I/O adapter, endpoint, initial adapter state;
creating an I/O adapter redundancy mapping from the table and assigning performance thresholds to each I/O adapter; and
continuously monitoring, by the IOP, utilization of each I/O adapter, wherein based on the utilization for the I/O adapter reaching a defined threshold, enabling a redundant I/O adapter path, wherein the redundant I/O adapter is a proxy for the I/O adapter.

16. The computer program product of claim 15, wherein the redundant path is disabled upon the utilization of the I/O adapter falling below another defined threshold.

17. The computer program product of claim 15, wherein there are one or more IOPs, based on a computer system architecture.

18. The computer program product of claim 15, wherein each I/O adapter is connected to only one IOP.

19. The computer program product of claim 15, wherein an operating system is agnostic to the proxy I/O adapter, wherein the operating system continues to issue I/O requests to the I/O adapter.

20. The computer program product of claim 15, wherein the bandwidth of the redundant I/O adapter is combined with that of the I/O adapter for an increased total bandwidth.

\* \* \* \* \*